US007231816B2

(12) United States Patent
Christian et al.

(10) Patent No.: US 7,231,816 B2
(45) Date of Patent: Jun. 19, 2007

(54) METHOD AND APPARATUS FOR CONTINUOUS MEASURING OF DYNAMIC FLUID CONSUMPTION

(75) Inventors: Rudolf Christian, Graz (AT); Michael Wiesinger, Graz (AT); Ferdinand Purkathofer, Radegund (AT)

(73) Assignee: AVL List GmbH, Graz (AT)

( * ) Notice: Subject to any disclaimer, the term of this patent is extended or adjusted under 35 U.S.C. 154(b) by 67 days.

(21) Appl. No.: 10/738,210

(22) Filed: Dec. 18, 2003

(65) Prior Publication Data
US 2004/0163459 A1 Aug. 26, 2004

(30) Foreign Application Priority Data
Dec. 18, 2002 (AT) ........................ GM853/2002 U

(51) Int. Cl.
*G01M 15/00* (2006.01)
(52) U.S. Cl. ........................................ 73/113
(58) Field of Classification Search ............. 73/112, 73/113, 114, 115, 116, 117.2, 117.3, 118.1, 73/119 A
See application file for complete search history.

(56) References Cited
U.S. PATENT DOCUMENTS
4,612,804 A 9/1986 Colonnello 5,284,120 A * 2/1994 Fukushima et al. ......... 123/510
5,708,201 A 1/1998 Kaub
5,773,716 A * 6/1998 Antonioli et al. ......... 73/119 A
2004/0211263 A1* 10/2004 Wiesinger et al. ............ 73/716

FOREIGN PATENT DOCUMENTS
| EP | 0043283 | 1/1982 |
|---|---|---|
| EP | 0491275 | 6/1992 |
| EP | 1091197 | 4/2001 |
| EP | 1113167 | 7/2001 |

* cited by examiner

*Primary Examiner*—Eric S. McCall
(74) *Attorney, Agent, or Firm*—Dykema Gossett PLLC

(57) ABSTRACT

A method and device for continuous measuring of dynamic fluid consumption, particularly gaseous or liquid motor fuel, employs a continuously operating flow sensor with variable decrease in pressure, preferably a mass flow sensor. The pressure downstream from the flow sensor is adjusted to a constant value by changing the admission pressure of the sensor to make possible accurate and rapid consumption measurements with controlled output pressure for the fluid by means of an open system, and also to allow simultaneous measuring of at least a short-time return flow. The device includes a preferably controllable pump (6) possibly a conditioning device and a tank (2), and continuously operating flow sensor (7) for the fluid, preferably a Coriolis sensor, whereby a line branches off behind the sensor (7) leading to a pressure sensor whose output is connected to a control device that triggers the devices to influence the volume flow upstream from the sensor (7).

6 Claims, 1 Drawing Sheet

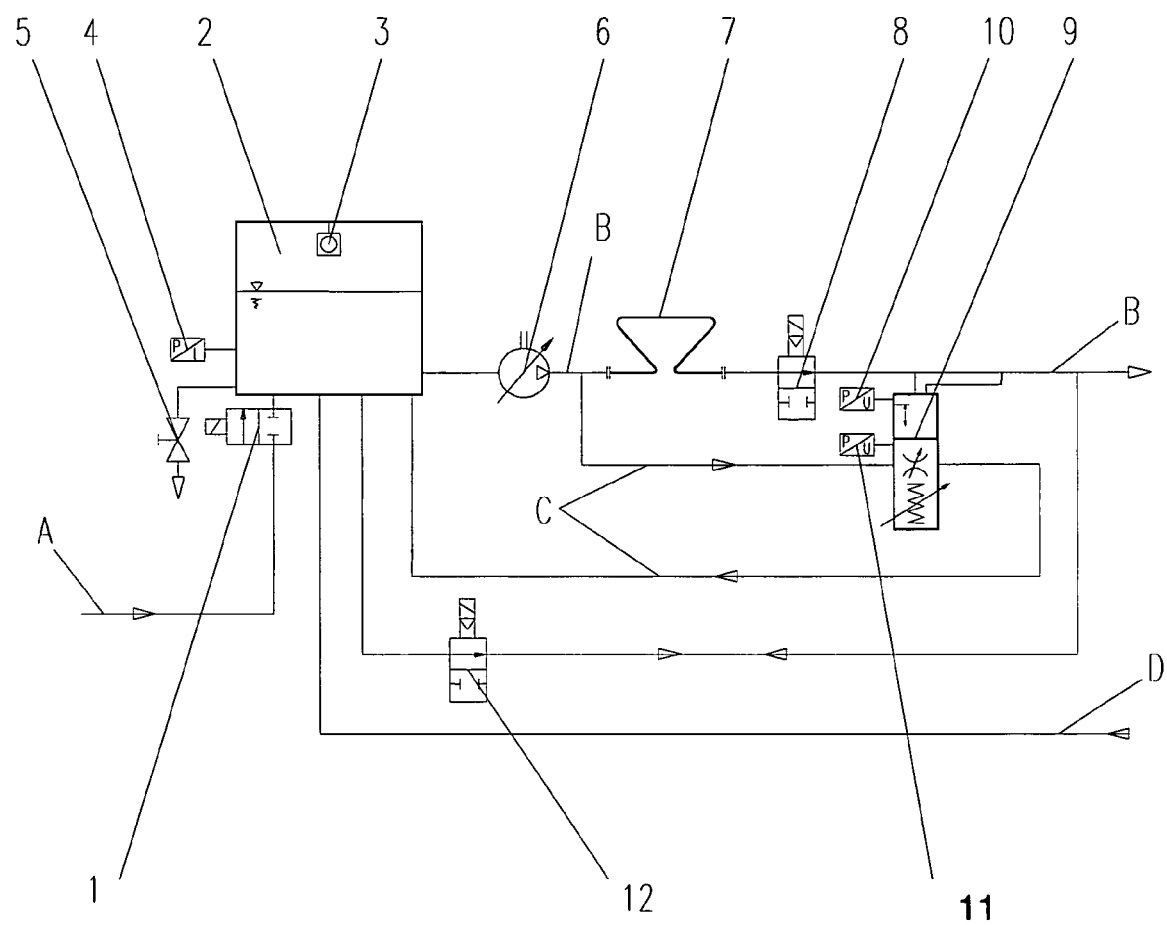

METHOD AND APPARATUS FOR CONTINUOUS MEASURING OF DYNAMIC FLUID CONSUMPTION

BACKGROUND OF THE INVENTION

1. Field of the Invention

Method for continuous measuring of dynamic fluid consumption, particularly gaseous or liquid motor fuel, by means of a continuous operating flow sensor with variable decrease in pressure, preferably a mass flow sensor, as well as a device to carry out the method comprising a preferably controllable pump, possibly a conditioning device and a fuel tank, and a continuously operating flow sensor for the fluid, preferably a Coriolis sensor.

2. The Prior Art

Intermittently-working systems based on weighing devices are known in the art in measuring consumption of fluids, especially in the use of measuring the liquid fuel consumption of engines on test benches. These devices have the advantage of being open systems, namely they have the characteristic feature that the fuel can be supplied to a user by the measuring system or can occasionally be returned into the system in limited amounts. The supplied and the returned quantity of fuel are recorded by the measuring method and are considered in the reading of total consumption. Open systems are especially advantageous in modern fuel injection system since the latter push back fuel, within limits, into the fuel supply system—particularly the tank in motor vehicles—at the start of the engine and during the pressure buildup in the fuel injection system. However, such weighing devices are of disadvantage in that they have to be filled up repeatedly and continuous measuring is not possible thereby.

Measuring devices are often used for continuous measuring of fuel consumption by performing volumetric measurements of the flow. The used fuel mass as the actual required measurement value is determined by means of an additional density measurement. Direct measurement of mass consumption, which avoids the disadvantage of additional density measuring, can be realized at the present only intermittently with the weighing method for liquid fuels and continuously only with Coriolis sensors for gaseous fuels.

Modern internal combustion engines require mostly defined pressure conditions within the fuel supply line as well as in the possibly existing fuel return line for proper operation, said pressure conditions independent from the fuel flow.

In the Austrian utility model No. 3.350 there is provided a pressure stabilization device, for example, to stabilize the input pressure of the mass flow sensor and to be able to create the required low and constant output pressure (generally of a few millibar) at the connection point to the user. The flow-dependent pressure drop (up to sometimes 2 bar) must therefore be variably compensated at the mass flow sensor. In particular, high frequency, erratic or pulsating-type drawing of fuel from the system must be rapidly taken into consideration.

A pressure regulator is attached upstream from the actual flow sensor for pressure stabilization in the above-mentioned continuous method for fuel measurement. Said pressure regulator adjusts the flow-dependent pressure to a constant outgoing pressure at the discharge point of the measuring system. It is of disadvantage in the arrangement of this type that conventional mechanical pressure regulators act like a "hydraulic diode", which means that the flowing medium can flow through the regulator only in one direction, namely downstream. A measuring system having such a pressure regulator is not an open system. Should fuel have to be returned from the injection system back into the measuring system or should there occur thermal expansion of the fuel caused by a temperature increase in the fuel circuit when the user has stopped operation, then there is created a mostly inadmissibly high pressure increase in the fuel system—depending on the elasticity of the tubing—and it places stress on the lines and components which must be relieved possibly by costly pressure compensation devices.

The object of the present invention is to provide a method and a device which make possible accurate and rapid consumption measurements with controlled outgoing pressure for the liquid or gaseous fluid by means of an open system and which also allows a short time return flow during simultaneous measuring of the flow.

SUMMARY OF THE INVENTION

The inventive method is characterized for achievement of this object in that the pressure behind the flow sensor is adjusted to a constant value by changing the admission pressure of the flow sensor. It can be achieved thereby that, on one hand, a constant pressure is made available at the discharge point of the measuring system in spite of a flow-dependent pressure decrease caused by the continuously operating and highly dynamic flow sensor, and that, on the other hand, a possible short-term return flow of the fluid is made possible, and, furthermore, that such a quantity of fluid flowing unrestricted back through the flow sensor into the system can also be measured and considered as negative consumption. Excessive pressure increase at the discharge point of the measuring system can be avoided thereby, especially during a short-term return flow, and an accurate consumption measurement can be made possible.

According to a first embodiment variant of the method above, it is proposed that the pressure is detected behind the flow sensor and given as input value of a control arrangement for the admission pressure of the sensor. The most direct influence on the admission pressure of the sensor is made possible by said variant and by the choice of the control arrangement there can be taken into account for the most diverse requirements.

According to an additional characteristic of the invention, the admission pressure can be adjusted advantageously by variable separation of the fluid flow before the sensor into a partial flow flowing through the sensor and into a bypassing partial flow (bypass) whereby the quantity of the partial flow flowing through the sensor is changed inversely relative to the pressure deviation from the set value existing behind the sensor. A relatively simple and operationally reliable solution of the object of the present invention is established that can be realized with simple apparatus.

There can also be provided an embodiment of the invention, alternatively or as a substitution whereby the admission pressure is adjusted by the change of the volume flow rate of the fluid flow upstream from the sensor and before a possible separation of the volume flow wherein the quantity of the volume flow is changed inversely to the pressure deviation from the set value existing behind the sensor. Through adjustment of the fluid flow possibly before a separation into partial flows, the devices for the separation process can be designed in a simpler manner, on the one hand, and, on the other hand, it can be avoided that a relatively large volume flow has to be returned whose inherent mechanical and thermal energy have to be removed again to maintain the conditioning requirements for the fuel, said energy being continuously produced, among other things, by the uncontrolled running pump operating at maximum capacity for pressure buildup.

The aforementioned device for continuous measuring of dynamic fluid consumption is characterized in the achievement of the stated object in that a line branches off behind the flow sensor leading to a pressure sensor whose output is connected to a control device which triggers the device that influences the volume flow upstream from the flow sensor. Direct feedback of pressure deviations of the desired or set supply pressure onto the feed system upstream from the sensor is possible through detection of the pressure behind the flow sensor through which subsequent flow-dependent pressure changes can be dynamically compensated in spite of continuous consumption measuring.

A first embodiment of the invention proposes that the pressure sensor is designed as an electric pressure sensor, e.g. a pressure/voltage converter or a pressure/current converter, or also as a digital pressure sensor having an electric or optic data interface whose output is connected to analog or digital control electronics and/or to control software. Feedback of change in pressure behind the sensor can easily be achieved, whereby different feedback characteristics can be achieved through corresponding characteristic curves or characteristic diagrams.

If in further development of the invention of the above-described embodiment there is additionally provided a pressure accumulator between the electric pressure sensor and the discharge point of the fluid, then additional pressure stabilization can occur in a proven manner for highly dynamic pressure changes.

A very simple, operationally reliable and very directly acting mechanical arrangement can be created according to an additional inventive embodiment, if the pressure sensor is designed as a mechanical hydraulic pressure regulator whose inlet is connected to a line branching off upstream from the flow sensor and whereby the line branching off behind the flow sensor is connected to the pressure sensing port of said pressure regulator. With such an arrangement possible considerable internal time constants of electronic control devices can be avoided to a great degree whereby the directness of feedback is limited only by the mass that has to be moved within the pressure regulator. In this case, additional pressure stabilization is provided for highly dynamic pressure changes at the output of the system through the volume existing on the side of the pressure sensing port in the pressure regulator whereby said volume is defined by a diaphragm that is movable by a small degree.

The pressure regulator is preferably integrated into the measuring system in an arrangement of this type in such a manner that the fluid flow leaving the outlet of the pressure regulator is returned to the tank or to the conditioning device.

The control device for the pump is advantageously connected to an electric pressure sensor which is disposed between the flow sensor and the pump or the conditioning device. It is made possible thereby that the pump does not always have to operate at maximum capacity. A high pump output is nevertheless required at high consumption; however, at low fuel consumption and at correspondingly low admission pressure upstream from the flow sensor, in case of a Coriolis sensor, it would be advantageous to have less dissipation loss in the separate bypassing flow (bypass). Pump control or pump adjustment is preferably designed in such a manner that the pump can be rapidly powered up for rapid drawing of fuel from the system and thereby for a rapid increase of the admission pressure, whereas turning the pump output down occurs comparatively slow at a decrease or complete stop of fluid extraction whereby fluid vibrations in the system can be avoided.

BRIEF DESCRIPTION OF THE DRAWING

The invention is described in more detail in the following description with the aid of embodiment examples and with reference to the accompanying drawing. The drawing shows a flow diagram of an inventive device in an example of a continuous fuel consumption measurement system for liquid fuels, particularly for engine test benches.

DETAILED DESCRIPTION OF THE PREFERRED EMBODIMENT

A tank 2 serving as reservoir is supplied with fluid, particularly motor fuel, through line A and a preferably electro-magnetically operatable fill valve 1. The tank 2 is additionally provided with a float switch or overflow line 3, a fuel level sensor 4, as well as a preferably manually operatable drain valve 5.

Fuel is fed from the tank 2 by means of a preferably controllable fuel pump 6 via line B to the continuously operating flow sensor 7, preferably a Coriolis sensor. Fuel flows to a discharge point via a preferably electro-pneumatically operatable shutoff valve 8 in line B, the engine being connected to said discharge point as user (not illustrated) and on which discharge point fuel is to be available at a specific predetermined pressure.

A line branches off from line B to the user downstream of the shutoff valve 8, which line leads to the sensing port of a preferably mechanical hydraulic pressure regulator 9. The pressure regulator 9 is advantageously provided with an output pressure sensor 10 and an input pressure sensor 11. The flow through a line C is now controlled by the pressure regulator 9 in dependence on the pressure line in B downstream of the flow sensor 7 whereby the line C branches off from line B between the fuel pump 6 and the flow sensor 7, and whereby the line C returns to the fuel tank 2 or a conditioning device (not shown) through the pressure regulator 9. A control circuit with feedback is thereby realized in which all pressure changes in line B downstream from the flow sensor 4 from an adjustable set value in the pressure regulator 9 are converted to same changes of the fluid flow which branches off through line C upstream from the flow sensor 7 from line B, and which is returned again into the tank 2 without flowing through the sensor 7. However, the admission pressure upstream from the flow sensor 7 is controlled by this change in quantity, inversely to the pressure change that occurs downstream from the flow sensor 7, so that the pressure deviation from the set value can be compensated in a rapid and dependable manner.

However, there could also be provided an electric pressure sensor, for instance a pressure/voltage converter, in place of the mechanical hydraulic pressure regulator 9 whose output is connected to the control electronics which control the separation of the fluid flows upstream from the flow sensor 7 by means of a proportionally adjustable valve in line C. In that case, a pressure accumulator is provided that is connected to line B behind the flow sensor 7 and preferably disposed between the electric pressure sensor and the discharge point for the fluid.

Moreover, the pump 6 could possibly be adjusted in dependence on the signals of the outgoing pressure sensor 10 and the incoming pressure sensor 11, preferably in dependence on the pressure difference between incoming pressure and outgoing pressure, to feed less fuel into line B at a pressure increase behind the flow sensor 7. Possible adjustment of the pump 6 in dependence on the pressure in line B upstream from the flow sensor 7 is advantageous as well.

Should there occur any forcing back of the fuel from the user into line B, then this fluid volume can be received by the tank 2 through the flow sensor 7 and line C.

An additional line can advantageously branch off from line B between the junction to the pressure regulator 9 and the discharge point to the user, and it may return also through an electro-pneumatic switchable deaeration/bypass valve 12 into the tank 2. A deaeration operation may be realized inside the apparatus while the valve 12 and the pump 6 are turned on. Provision for an additional fuel return line D, which line D is a direct connection of a possible existing fuel return line of the user to the tank 2, makes possible a deaeration of the fuel lines up until to the user.

The invention claimed is:

1. A device for continuously measuring dynamic fluid consumption by a user, said device comprising a tank for holding fluid, a primary fluid flow line extending between the tank and the user, pumping means consisting of a single fluid pump in said primary fluid flow line for pumping fluid from said tank to the user, a flow sensor connected to said primary fluid flow line between the fluid pump and the user, a pressure sensor connected to said primary flow line between the flow sensor and the user, control means for controlling volume flow of fluid in said primary flow line between the tank and the flow sensor based on pressures measured by said pressure sensor, said primary fluid flow line allowing fluid to flow from the user back through the flow sensor.

2. A device for continuously measuring dynamic fluid consumption by a user, said device comprising a tank for holding fluid, a primary fluid flow line extending between the tank and a discharge point where a user can be connected to the device, a fluid pump in said primary fluid flow line for pumping fluid from said tank to said discharge point, a flow sensor connected to said primary fluid flow line between the fluid pump and the discharge point, a pressure sensor connected to said primary flow line between the flow sensor and the discharge point, control means for controlling volume flow of fluid in said primary flow line between the tank and the flow sensor based on pressures measured by said pressure sensor, said primary fluid flow line itself allowing fluid to flow from the discharge point back through the flow sensor.

3. A device according to claim 2, wherein said pressure sensor is an electric pressure sensor.

4. A device according to claim 3, including a pressure accumulator between the electric pressure sensor and a discharge point for the fluid.

5. A device according to claim 2, wherein the control means includes a secondary fluid flow line which branches off said primary flow line between the fluid pump and the flow sensor, and a pressure regulator within said secondary fluid flow line, said pressure regular controlling fluid flow in said secondary fluid flow line based on the pressure in said primary fluid flow line between the flow sensor and the discharge point.

6. A device according to claim 5, whereby the secondary fluid flow line extends directly back to said tank.

* * * * *